US006204325B1

(12) United States Patent
Maletzko et al.

(10) Patent No.: US 6,204,325 B1
(45) Date of Patent: Mar. 20, 2001

(54) COMPACT, TRANSPARENT POLYISOCYANATE POLYADDITION PRODUCTS

(75) Inventors: Christian Maletzko, Altrip; Edwin Baumann, Schifferstadt; Ilka Renate Beuermann, Pulheim; Peter Roche, Emmering; Ulrich Treuling, Bensheim; Hans-Peter Frei, Eichenau, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/266,217

(22) Filed: Mar. 10, 1999

(30) Foreign Application Priority Data

Mar. 16, 1998 (DE) .............................................. 198 11 289

(51) Int. Cl.[7] ................................ C08J 3/00; C08K 3/20; C08L 75/00; C08G 18/00; C08G 18/30
(52) U.S. Cl. ......................... 524/875; 524/589; 524/590; 524/839; 524/840; 528/44; 528/59; 528/60; 528/85
(58) Field of Search ...................................... 524/590, 589, 524/839, 875; 528/60, 59, 85

(56) References Cited

U.S. PATENT DOCUMENTS

| 4,131,605 | 12/1978 | Ammons . | |
|---|---|---|---|
| 4,929,667 | 5/1990 | Ban et al. . | |
| 5,045,623 | * 9/1991 | Horn et al. ............................. | 528/60 |
| 5,288,787 | 2/1994 | Khalil et al. . | |
| 5,306,798 | * 4/1994 | Horn et al. ............................. | 528/58 |
| 5,824,738 | 10/1998 | Humphrey et al. . | |

FOREIGN PATENT DOCUMENTS

| 2212254 | 2/1996 | (CA) . |
|---|---|---|
| 0 327 031 | 8/1989 | (EP) . |
| 0 511 586 A1 | 11/1992 | (EP) . |
| 712887 | 5/1996 | (EP) . |
| WO96/23827 | 8/1996 | (WO) . |

* cited by examiner

Primary Examiner—Patrick D. Niland
(74) Attorney, Agent, or Firm—Fernando A. Borrego

(57) ABSTRACT

Compact, transparent polyisocyanate polyaddition products are produced in a process by reacting (a) isocyanates with (b) compounds reactive to isocyanates, if desired in the presence of (c) catalysts and (d) auxiliaries and/or additives, which comprises using as (b) compounds reactive to isocyanates a mixture (i) which has an average functionality of >3 and an average hydroxyl number of from 300 to 950 mg KOH/g.

5 Claims, No Drawings

COMPACT, TRANSPARENT POLYISOCYANATE POLYADDITION PRODUCTS

The invention relates to processes for producing compact, transparent polyisocyanate polyaddition products by reacting (a) isocyanates with (b) compounds reactive to isocyanates, if desired in the presence of (c) catalysts and (d) auxiliaires and/or additives. The invention also relates to compact, transparent polyisocyanate polyaddition products which can be produced by this process, and to their use.

Compact polyisocyanate polyaddition products, also termed products below, and their production are well known and have been described many times in the technical literature. These products are increasingly used in markets in which use is usually made of glass, for example as windows or lamp covers in the construction of buildings, automobiles or aircraft. A particular advantage of the plastics compared with glass is their low density and low brittleness, making it possible to save fuel and to reduce the formation of splinters when accidents occur. WO 96/23827, for example, describes compact, transparent polyurethanes for producing windows for buildings, automobiles or aircraft. The products of Wo 96/23827 are produced by reacting cycloaliphatic isocyanates with bifunctional polyols to give an NCO-terminated prepolymer, followed by reaction of the prepolymer with a diamine. Disadvantages of these products are their relatively low hardness of Shore D 80-81 and their large coefficient of thermal expansion.

However, a high level of hardness and a low coefficient of thermal expansion are precisely what is required, in particular in automotive and aircraft construction, for example to avoid damage to the products by scratching.

It is an object of the present invention to develop a process for producing compact, transparent polyisocyanate polyaddition products by reacting (a) isocyanates with (b) compounds reactive to isocyanates, if desired in the presence of (c) catalysts and (d) auxiliaries and/or additives, which is capable of producing products with excellent suitability to replace glass. These products should have, in particular, a high level of hardness and a low coefficient of thermal expansion.

We have found that this object is achieved by using as (b) compounds reactive to isocyanates a mixture (i) which has an average functionality of >3 and an average hydroxyl number of from 300 to 950 mg KOH/g.

According to the invention, the high average functionality, i.e. of the functions which are reactive to isocyanates, of the mixture and its high average hydroxyl number, also termed OHN below, achieve strong crosslinking with the isocyanates in the novel products. This gives the desired high level of hardness and thus scratch resistance of the products. In addition to this, the cross-linking gives the products the desired low coefficient of thermal expansion measured in accordance with DIN 53752 (Method A, with continuous heating).

The mixture (i) preferably has an average functionality of from 3 to 6, particularly preferably from 3.1 to 5. The average OHN of the mixture (i) is preferaby from 400 to 900 mg KOH/g, in particular from 500 to 850 mg KOH/g.

The use in this text of the expression mixture does not imply that the compounds present therein are necessarily in the form of a mixture when brought into contact with the isocyanates, but merely defines the material which is to have the average functionalities and hydroxyl numbers according to the invention.

The mixture (i) used to produce the compact, transparent polyisocyanate polyaddition products is preferably one which has an average functionality of >3 and an average hydroxyl number of from 300 to 950 mg KOH/g and comprises the following components:

from 45 to 99% by weight of a mixture (ii) comprising at least one polyether polyalcohol, where the mixture (ii) has an average functionality of at least 3, preferably from 3.1 to 6, and an average hydroxyl number of from 650 to 950 mg KOH/g, preferably from 700 to 940 mg KOH/g, and from 1 to 55% by weight of a mixture (iii) comprising at least one polyester polyalcohol, where the mixture (iii) has an average functionality of from 2 to 3 and an average hydroxyl number of from 20 to 200 mg KOH/g.

The polyether polyalcohols present in the mixture (ii) according to the invention may be well known compounds which are produced by known processes, for example by alkoxylating starter materials with alkylene oxides. The preparation may be carried out as an anionic polymerization with alkali metal hydroxides as catalysts, such as sodium hydroxide or potassium hydroxide or with alkali metal alcoholates, such as sodium methylate, sodium ethylate, potassium ethylate or potassium isopropylate, and with the addition of at least one starter molecule which contains from 2 to 8 reactive hydrogen atoms, preferably from 2 to 6 reactive hydrogen atoms, or as a cationic polymerization with Lewis acids as catalysts, such as antimony pentachloride, boron fluoride etherate, etc. or bleaching earth, with one or more alkylene oxides having from 2 to 4 carbon atoms in the alkylene radical.

The catalyst is usually removed after the synthesis by acid neutralization, distillation and filtration. The acids used are primarily the two mineral acids hydrochloric acid and/or phosphoric acid, because the equivalence point can be precisely controlled and the technology for removing any excess of acid is simple.

Examples of suitable alkylene oxides for preparing the polyols are tetrahydrofuran, 1,3-propylene oxide, 1,2- or 2,3-butylene oxide, styrene oxide and preferably ethylene oxide and 1,2-propylene oxide. The alkylene oxides may be used individually, alternating in succession or as mixtures. Preference is given to the use of alkylene oxides which give primary hydroxyl groups in the polyol. Particular preference is given to the use of polyols which to complete the alkoxylation have been alkoxylated with ethylene oxide, and therefore have primary hydroxyl groups.

Examples of starter molecules are: water, organic dicarboxylic acids, such as succinic acid, adipic acid, phthalic acid and terephthalic acid, aliphatic and aromatic diamines which have from 1 to 4 carbon atoms in the alkyl radical and are either unsubstituted or N-mono- or N,N- or N,N'-dialkyl-substituted, such as unsubstituted, or if desired mono- or dialkyl-substituted ethylenediamine, diethylenetriamine, triethylenetetramine, 1,3-propylenediamine, 1,3- or 1,4-butylenediamine, 1,2-, 1,3-, 1,4-, 1,5- or 1,6-hexamethylenediamine, phenylenediamine, 2,3-, 2,4- or 2,6-toluylenediamine and 4,4'-, 2,4'- and 2,2'-diaminodiphenylmethane.

Other possible starter molecules are: alkanolamines, such as ethanolamine, N-methyl- and N-ethylethanolamine, dialkanolamines, such as diethanolamine, N-methyl- and N-ethyldiethanolamine, and trialkanolamines, such as triethanolamine, and ammonia, and also polyhydric alcohols, such as ethanediol, 1,2-propanediol, 1,3-propanediol, diethylene glycol, dipropylene glycol, 1,4-butanediol, 1,6-hexanediol, glycerol, trimethylolpropane, pentaerythritol, sorbitol and sucrose.

To achieve the average functionality according to the invention, use is preferably made of starter molecules which have a functionality of at least 3. It is possible to include in the mixture (ii) polyether polyalcohols with a lower functionality, but in that case at least one more highly functionalized polyether polyalcohol should be present in the mixture (ii) in amounts such that the average functionality achieves a value according to the invention.

The polyether polyalcohols preferably used in the mixture (ii) are products of addition of ethylene oxide and/or propylene oxide to glycerol, trimethylolpropane, ethylenediamine and/or pentaerythritol individually or in mixtures.

The polyester polyalcohols present in the mixture (iii) according to the invention may be well known compounds which are prepared by known processes. Suitable polyester polyols may, for example, be prepared from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of possible dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. These dicarboxylic acids may be used individually or else in a mixture with one another. Instead of the free dicarboxylic acids, it is also possible to use the corresponding dicarboxylic acid derivatives, such as esters of dicarboxylic acids with alcohols having from 1 to 4 carbon atoms, or anhydrides of dicarboxylic acids. Examples of di- and polyhydric alcohols are: ethanediol, diethylene glycol, 1,2- and 1,3-propanediol, dipropylene glycol, 1,4-butanediol, 1,5-pentanediol, 1,6-hexanediol, 1,10-decanediol, 1,12-dodecanediol, glycerol and trimethylolpropane. Preference is given to the use of ethanediol, diethylene glycol, 1,4-butanediol, 1,5-pentanediol, 1,6-hexanediol, glycerol and trimethylolpropane. It is also possible to use polyester polyols made from lactones, e. g. $\epsilon$-caprolactone or hydroxycarboxylic acids, e.g. $\omega$-hydroxycaproic acid.

To prepare the polyester polyols, the organic, e.g. aromatic and preferably aliphatic, polycarboxylic acids and/or derivatives of these and polyhydric alcohols may be polycondensed without a catalyst or preferably in the presence of esterification catalysts, usefully in an atmosphere of inert gas, e.g. nitrogen, carbon monoxide, helium, argon, etc., in the melt at from 150 to 250° C., preferably from 180 to 220° C., if desired under reduced pressure, as far as the desired acid number, which is advantageously less than 10, preferably less than 2. In a preferred embodiment, the esterification mixture is polycondensed to an acid number of from 80 to 30, preferably from 40 to 30, under atmospheric pressure and then under a pressure of less than 500 mbar, preferably from 50 to 150 mbar. Examples of possible esterification catalysts are catalysts using iron, cadmium, cobalt, lead, zinc, antimony, magnesium, titanium or tin, in the form of metals, metal oxides or metal salts. However, the polycondensation may also be carried out in a liquid phase in the presence of diluents and/or carriers, such as benzene, toluene, xylene or chlorobenzene for azeotropic removal of the water of condensation by distillation.

To prepare the polyester polyols, the organic polycarboxylic acids and/or their derivatives are polycondensed with polyhydric alcohols, advantageously in a molar ratio of from 1:1 to 1.8, preferably from 1:1.05 to 1.2.

The resultant polyester polyols preferably have a functionality of from 2 to 4, in particular from 2 to 3, and a hydroxyl number of preferably from 20 to 200 mg KOH/g.

In addition to the compounds (b) reactive to isocyanates mentioned as examples for the mixtures (i), (ii) and (iii), use may be made in the novel process of other compounds (b) reactive to isocyanates, for example conventional polythioether polyols, polymer-modified polyether polyols, preferably graft polyether polyols, in particular those based on styrene and/or acrylonitrile, polyether polyamines, polyacetals containing hydroxyl groups or aliphatic polycarbonates containing hydroxyl groups or mixtures of at least two of the polyols mentioned, which may be prepared by well known processes. The compounds (b) reactive to isocyanates may also be diols, triols and/or polyols with molecular weights <400, for example aliphatic, cycloaliphatic and/or araliphatic diols having from 2 to 14 carbon atoms, preferably from 4 to 10 carbon atoms, such as ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)-hydroquinone, trioles, such as 1,2,4- and 1,3,5-trihydroxycyclohexane, glycerol and trimethylolpropane, and low-molecular-weight polyalkylene oxides containing hydroxyl groups and based on ethylene oxide and/or 1,2-propylene oxide and on the abovementioned diols and/or triols as starter molecules.

The compounds (b) reactive to isocyanates and used in the novel process are particularly preferably composed of the mixture (i) which has an average functionality of >3 and an average hydroxyl number of from 300 to 950 mg KOH/g, which in turn is particularly preferably composed of:

from 45 to 99% by weight of a mixture (ii) comprising at least one polyether polyalcohol, where the mixture (ii) has an average functionality of at least 3, preferably from 3.1 to 6, and an average hydroxyl number of from 650 to 950 mg KOG/g, preferably from 700 to 940 mg KOH/g, and from 1 to 55% by weight of a mixture (iii) comprising at least one polyester polyalcohol, where the mixture (iii) has an average functionality of from 2 to 3 and an average hydroxyl number of from 20 to 200 mg KOH/g.

Possible isocyanates (a) are the aromatic, araliphatic, aliphatic and/or cycloaliphatic organic isocyanates known per se, preferably diisocyanates.

Individual compounds which may be mentioned are: alkylene diisocyanates having from 4 to 12 carbon atoms in the alkylene radical, such as 1,12-dodecane diisocyanate, 2-ethyltetramethylene 1,4-diisocyanate, 2-methylpentamethylene 1,5-diisocyanate, tetramethylene 1,4-diisocyanate, lysine ester diisocyanate (LDI) and hexamethylene 1,6-diisocyanate (HDI); cycloaliphatic diisocyanates, such as cyclohexane 1,3- and 1,4-iisocyanate, and also any desired mixture of these isomers, hexahydrotolylene 2,4- and 2,6-diisocyanate, and also the corresponding isomer mixtures, dicyclohexylmethane 4,4'-, 2,2'- and 2,4'-diisocyanate, and also the corresponding isomer mixtures, and 1-isocyanato-3,3,5-trimethyl-5-isocyanatomethyl-cyclohexane (IPDI). Other examples of isocyanates (a) which may be mentioned are: tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,21-iisocyanates, polyphenyl polymethylene polyisocyanates, mixtures of diphenylmethane 4,4'-, 2,4'- and 2,2'-iisocyanates and polyphenyl polymethylene polyisocyanates (crude MDI) and mixtures of crude MDI and tolylene diisocyanates. It is also possible to use mixtures comprising at least two of the isocyanates mentioned as (a).

In the novel process it is also possible to use di- and/or polyisocyanates containing modified isocyanates with isocyanurate groups, biuret groups, ester groups, urea groups, allophanate groups, carbodiimide groups, uretdione groups and/or urethane groups. The latter are also referred to below by the term urethane-group-modified. Individual examples of these are: organic polyisocyanates containing urethane groups and with NCO contents of from 50 to 15% by weight, preferably from 35 to 21% by weight, based on the total weight, for example with low-molecular-weight diols, triols, dialkylene glycols, trialkylene glycols or with polyoxyalkylene glycols having molecular weights of up to 6000, in particular having molecular weights up to 1500, modified diphenylmethane 4,4'-diisocyanate, modified diphenylmethane 4,4'- and 2,4'-diisocyanate mixtures, modified crude MDI or tolylene 2,4- or 2,6-diisocyanate. Di- and polyoxyalkylene glycols which may be mentioned here as examples, and may be used individually or as mixtures, are: diethylene and diprodylene glycol, and polyoxyethylene, polyoxypropylene and polyoxypropylene polyoxyethene glycols, triols and/or tetroles. Other suitable materials are prepolymers containing NCO groups and having NCO contents of from 25 to 3.5% by weight, preferably from 21 to 14% by weight, based on the total weight, prepared from the polyester polyols and/or preferably polyether polyols described and diphenylmethane 4,4, diisocyanate, mixtures of diphenylmethane 2,4'- and 4,4'-diisocyanate, and tolylene 2,4- and/or 2,6-diisocyanates, or crude MDI. Other proven materials are liquid polyisocyanates containing carbodiimide groups and having NCO contents of from 33.6 to 15% by weight, preferably from 31 to 21% by weight, based on the total weight, and based, for example, on diphenylmethane 4,4'-, 2,4'- and/or 2,2'-diisocyanate and/or tolylene 2,4- and/or 2,6-diisocyanate. The modified polyiso- cyanates may, if desired, be mixed with one another or with unmodified organic polyisocyanates, such as diphenylmethane 2,4'- or 4,41-diisocyanate, crude MDI or tolylene 2,4- and/or 2,6-diisocyanate.

The modified isocyanates used are preferably isocyanuratized, biuretized and/or urethane-group-modified aliphatic and/or cycloaliphatic diisocyanates, for example those already mentioned, which may have been biuretized and/or cyanuretized by known processes and have at least one, preferably at least two, free isocyanate groups, particularly preferably three free isocyanate groups. The trimerization of the isocyanates to prepare the isocyanates with isocyanurate structure may be carried out at the usual temperatures in the presence of known catalysts, for example phosphines and/or phosphorin derivatives, amines, alkali metal salts, metal compounds and/or Mannic bases. Trimerized isocyanates containing isocyanurate structures are also commercially available. Isocyanates with biuret structures may be prepared by well known processes, for example by reacting the diisocyanates mentioned with water or, for example, with diamines. The intermediate products produced here are urea derivatives. Biuretized isocyanates are also commercially available.

Particularly preferred isocyanates (a) are aliphatic and/or cycloaliphatic diisocyanates, in particular hexamethylene 1,6-diisocyanate, the isomers of dicyclohexylmethane diisocyanate and 1-isocyanato-3,3,5-trimethyl-5-isocyanatomethylcyclohexane, which may, if desired, have been isocyanuratized, biuretized and/or urethane-group-modified.

An advantage of the aliphatic and/or cycloaliphatic isocyanates is that the products produced therewith have better lightfastness and little intrinsic color.

The catalysts (c) used to produce the products may, if desired, be well known compounds which markedly accelerate the reaction of isocyanates with the compounds reactive to isocyanates. The total catalyst content preferably used here is from 0.001 to 15% by weight, in particular from 0.05 to 6% by weight, based on the total weight used of the compounds (b) reactive to isocyanates.

Examples of possible catalysts (c) will now be mentioned: tertiary amines, such as triethylamine, tributylamine, dimethylbenzylamine, dicyclohexylmethylamine, dimethylcyclohexylamine, N,N,N',N'-tetramethyldiaminodiethyl ether, bis(dimethylaminopropyl) urea, N-methyl- and N-ethylmorpholine, N-cyclohexylmorpholine, N,N,N'N'-tetramethylethylenediamine, N,N,N',N'-tetramethylbutanediamine, N,N,N',N'-tetramethyl-1,6-hexanediamine, pentamethyldiethylenetriamine, dimethylpiperazine, N-dimethylaminoethylpiperidine, 1,8-diazabicyclo-[5.4.0]-7-undecene, 1,2-dimethylimidazole, 1-azabicyclo-[2.2.0]octane, 1,4-diazabicyclo[2.2.2]octane (Dabco), alkanolamine compounds, such as triethanolamine, triisopropanolamine, N-methyl- and N-thyldiethanolamine, dimethylaminoethanol, 2-(N,N-dimethylaminoethoxy) ethanol, N,N',N"-tris-(dialkylaminoalkyl) hexahydrotriazines, such as N,N',N"-tris-(dimethylaminopropyl)-s-hexahydrotriazine, and preferably triethylenediamine, pentamethyldiethylenetriamine and/or bis(dimethylaminoethyl) ether; metal salts, such as inorganic and/or organic compounds of iron, of lead, of zinc and/or of tin in the usual oxidation states of the metal, for example iron(II) chloride, zinc chloride, lead octoate and preferably tin salts, such as tin dioctoate, tin diethylhexoate, dibutyltin dilaurate and/or dibutyldilauryltin mercaptide.

Compounds particularly preferred as (c) are dibutyltin dilaurate, tin dioctoate and/or dibutyldilauryltin mercaptide; amidines, such as 2,3-dimethyl-3,4,5,6-tetrahydropyrimidine, tetraalkylammonium hydroxides, such as tetramethylammonium hydroxide, alkali metal hydroxides, such as sodium hydroxide, and alkali metal alcoholates, such as sodium methylate and potassium isopropylate, and also alkali metal salts of long-chain fatty acids having from 10 to 20 carbon atoms and, if desired, OH side groups. The catalysts (c) mentioned as examples may be used individually or in mixtures comprising at least two of the catalysts mentioned.

The auxiliaries and/or additives (d) used if desired in the novel process may be the usual substances. Examples which may be mentioned are surface-active substances, fillers, dyes, pigments, flame retardants, hydrolysis inhibitors, substances with fungistatic or bacteriostatic action, and also UV stabilizers and antioxidants, insofar as these do not inpair the transparency of the products. This can be determined by means of simple routine experiments. It is also possible to use pigments and/or dyes in order to obtain tinted or colored moldings.

The use of antioxidants and UV stabilizers, in particular, can be advantageous in the novel process for many of the application sectors for the novel, transparent polyisocyanate polyaddition products, since addition of these materials can prevent yellowing, discoloration or embrittlement of the products. Examples of UV stabilizers which can be used are the compounds mentioned in EP-A 712 887 on page 4, lines 10 to 20.

Examples of antioxidants which can be used are the substances described in EP-A 712 887 on page 4, lines 21 to 28.

Examples of suitable pigments are also disclosed in EP-A 712 887 on page 4, lines 29 to 37.

To produce the novel products, the isocyanates (a) and the compounds (b) reactive to isocyanates are reacted in amounts such that the equivalence ratio of NCO groups of (a) to the total of the reactive hydrogen atoms of (b) is from 0.95 to 1.3:1, preferably from 1 to 1.2:1 and in particular from 1 to 1.15:1. If there are at least some bonded isocyanurate groups present within the polyurethane moldings, the ratio used of NCO groups to the total of the reactive hydrogen atoms is usually from 1.5 to 60:1, preferably from 1.5 to 8:1.

The reaction according to the invention preferably takes place under very complete exclusion of water, and particularly preferably under total exclusion of water.

The products are usually produced by the known one-shot process or by the prepolymer process, which is likewise known.

In a first step of the known prepolymer process, a prepolymer which has isocyanate groups is usually prepared from (a) and an excess of (b). This is then reacted with further (b) to give the desired products. An advantage of the prepolymer process in the novel process was that the shrinkage could be reduced during production of the product.

In the one-shot process, the components (a), (b) and, if desired, (c) and/or (d) are reacted to give the product in one step. It has proven advantageous here to operate by the two-component method and to combine components (b) and, if desired, the catalysts (c) and/or auxiliaries and/or additives (d) in component (A), and to use the isocyanates (a) as component (B).

The compounds reactive to isocyanates and present according to the invention in the mixtures (i), (ii) and (iii) may be metered into the reaction mixture individually or else, preferably, as in the two-component process for example, in a mixture.

The reaction to give the product follows well known processes, for example hand casting, use of high-pressure or low-pressure machines, or RIM (reaction injection molding), in open or, preferably, closed molds, for example metallic molds. Suitable PU processing machines are available commercially (e.g. from Elastogran, Isotherm, Hennecke, Kraus Maffei, etc.). It has proven advantageous for the components to be devolatilized by applying reduced pressure (from 1 to 759 Torr) before processing, so that the moldings obtained are free from bubbles. It is also advantageous during processing with PU machines for the storage vessels to be under reduced pressure during the processing.

Depending on the application, the starting components are usually mixed at from 0 to 100° C., preferably from 20 to 80° C., and introduced into the open mold, or if desired under super-atmospheric pressure into the closed mold. The mixing can be carried out mechanically using a stirrer or a mixing screw, or may take place in a conventional high-pressure mixing head. According to the invention, the reaction temperature in the mold, i.e. the temperature at which the reaction takes place, is >40° C., preferably from 60 to 100° C. After a period of from 0.5 to 15 minutes, the reaction is usually completed sufficiently for the product to be removable from the mold. The product is preferably then annealed at from 100 to 160° C., preferably in a mold, to give complete reaction of the isocyanate groups.

With the novel process it is also possible to produce transparent outer layers which usually have a thickness of from 0.1 to 3 mm. These outer layers which can assume, for example, the role of a multilayer clear-coat, e.g. to protect surfaces, for example parts of the dashboard, are produced in the one-shot or the prepolymer process as described above. For this, the components are applied in an open or closed mold to the object which is to be protected by the product. If desired, the surface may be further improved by subsequent grinding or polishing.

The products produced by the novel process usually have a density of from 0.95 to 1.20 g/cm$^3$.

The compact, transparent polyisocyanate polyaddition products obtainable by the novel process may preferably be used as a glass substitute, for example as sun roofs, front windows, back windows or side windows in automotive or aircraft construction and/or as lamp covers, for example as front lamps or rear lamps in aircraft or automotive construction.

The sun roofs, front windows, back windows or side windows in automotive or aircraft construction or lamp covers containing the novel compact, transparent polyisocyanate polyaddition products have a high level of hardness and a low level of brittleness, and also a reduced coefficient of thermal expansion.

The invention is described in more detail in the following working examples.

The starting components for producing the novel compact, transparent polyisocyanate polyaddition products, and the amounts used, are given in Table 1.

To produce the products, the respective polyols and catalysts are mixed intensively with one another. The isocyanate or the isocyanate mixture was then added, and the mixture was again homogenized intensively. The components were controlled to 50° C. during the addition and the mixing. The mixtures were then directly charged manually to a mold at 60° C., or 80° C. in the case of Example 3, of dimensions 20×25×0.4 cm, and the mixtures were reacted for a period of 10 minutes.

TABLE 1

| Example | 1 | 2 | 3 |
|---|---|---|---|
| Polyol A [g] | 60 | — | — |
| Polyol B [g] | — | 60 | 60 |
| Polyol C [g] | 20 | 20 | 20 |
| Polyol D [g] | 20 | 20 | 20 |
| Cat. A [g] | 0.1 | 0.2 | 0.1 |
| Cat. B [g] | 0.1 | 0.1 | 0.1 |
| Cat. C [g] | — | — | — |
| NCO A [g] | 250.9 | 32.9 | — |
| NCO B [g] | — | 131.6 | 150.3 |
| NCO:OH | 1 | 1.1 | 1.1 |

Polyol A: polyether polyalcohol with an hydroxyl number of 925 mg KOH/g, prepared by reacting trimethylolpropane with ethylene oxide;

Polyol B: polyether polyalcohol with an hydroxyl number of 875 mg KOH/g, prepared by reacting trimethylolpropane with propylene oxide;

Polyol C: polyether polyalcohol with an hydroxyl number of 770 mg KOH/g, prepared by reacting ethylenediamine with propylene oxide;

Polyol D: polyester polyalcohol with an average functionality of 2.7 and OHN of 60 mg KOH/g, based on adipic acid, diethylene glycol and trimethylolpropane;

Cat. A: tin catalyst (Witco Formrez UL 32);

Cat. B: 33% strength solution of diazabicyclooctane in dipropylene glycol;

Cat. C: 1,8-diazabicylo[5.4.0]-7-undecene (Air Products Polycat DBU);

NCO A: isocyanate A: oligomeric, isocyanuratized hexamethylene diisocyanate (BASF Aktiengesellschaft Basonat® HI 100), NCO content 21.5%;

NCO B: isocyanate B: IPDI, NCO content 37.8%.

In another example, Example 4, the reaction was not carried out by the one-shot method as in Examples 1 to 3, but by the prepolymer method. The description of the components are as given in the key to Table 1.

EXAMPLE 4

The isocyanate prepolymer was prepared by reacting 200 g of NCO B with 30 g of polyol B at 80° C. The polyol here was added dropwise to the isocyanate over a period of 1 hour. Following the addition, the reaction was carried to completion for 2 hours at the same temperature. To ensure complete reaction of the prepolymer and to accelerate this, it can be advantageous for catalysts to be present during the preparation. For example, from 0.001 to 0.1% by weight of catalyst in the isocyanate, based on the weight of the isocyanate, has proven successful. This amount of catalyst is related to the prepolymer preparation, and can be used in addition to the amounts of catalyst already described. Appropriate catalysts have been described earlier in the text.

209 g of the prepolymer were then injected into a closed plate mold whose temperature was 100° C., together with a mixture of 50 g of polyol B, 25 g of polyol C, 25 g of polyol D, 1.0 g of Cat. A and 1.25 g of Cat. C, using a high-pressure machine and the RIM process. The components were held at 60° C. during this procedure. The reaction in the mold was carried out for a period of 3 minutes.

The novel products produced in Examples 1 to 3 were annealed at 120° C. after the reaction for a period of 1 hour.

The novel, transparent products had the properties given in Table 2.

TABLE 2

| Example | 1 | 2 | 3 | 4 |
|---|---|---|---|---|
| Shore D hardness | 90 | 97 | 91 | 90 |
| Tensile strength [N/mm$^2$] | 70 | 69 | 47 | 61 |
| Elongation at break [%] | 5 | 2 | 2 | 2 |
| Impact strength (4J) [kJ/m$^2$] | n.d. | n.d. | 18 | 23 |
| Flexural strength [N/mm$^2$] | n.d. | n.d. | 96 | 99 |
| Flexural modulus of elasticity (3P) [N/mm$^2$] | n.d. | n.d. | 2780 | 2860 |
| Coefficient of thermal expansion [×10$^5$] | n.d. | n.d. | n.d. | 6.5 |
| Glass transition temperature Tg [° C.] | 72 | 121 | 114 | 110 | n.d.: not determined

The glass transition temperature was determined using DSC (differential scanning calorimetry). This glass transition temperature gives the temperature at which an amorphous material becomes mobile, that is to say softens. As can be seen from the high glass transition temperatures, the products therefore have particularly good heat resistance. The coefficient of thermal expansion is defined as the factor by which the molding expands/elongates per degree Celsius of temperature increase. The novel products had the desired high level of hardness. The hardness is measured as Shore D hardness in accordance with DIN 53505.

We claim:

1. A process for producing compact, transparent polyisocyanate polyaddition products, said process comprising reacting (a) aliphatic and/or cycloaliphatic diisocyanates with (b) compounds reactive to isocyanates, optionally in the presence of (c) catalysts and (d) auxiliaries and/or additives, wherein said compounds reactive to isocyanates comprise a mixture of compounds (i) which has an average functionality of >3 and an average hydroxyl number of from 300 to 950 mg KOH/g.

2. A process as claimed in claim 1 wherein said mixture (i) comprises:

from 45 to 99% by weight of a mixture (ii) comprising at least one polyether polyalcohol, where the mixture (ii) has an average functionality of at least 3 and an average hydroxyl number of from 650 to 950 mg KOH/g, and from 1 to 55% by weight of a mixture (iii) comprising at least one polyester polyalcohol, where the mixture (iii) has an average functionality of from 2 to 3 and an average hydroxyl number of from 20 to 200 mg KOH/g.

3. A process as claimed in claim 1, wherein the isocyanates used as (a) are aliphatic and/or cycloaliphatic isocyanates.

4. A compact, transparent polyisocyanate polyaddition product obtained by a process as claimed in claim 1.

5. A process as claimed in claim 1, wherein said diisocyanates are selected from the group consisting of hexamethylene 1,6-diisocyanate, the isomers of dicyclohexylmethane diisocyanate and/or 1-isocyanato-3,3,5-trimethyl-5-isocyanatomethyl-cyclohexane, and isocyanuratized, biuretized and/or urethane-modified isomers thereof, and mixtures thereof.

* * * * *